Jan. 10, 1950     A. GOETTER     2,494,476
REPAIR COUPLING FOR CHRISTMAS TREE BRANCHES
Filed Sept. 16, 1948
Fig. 1.
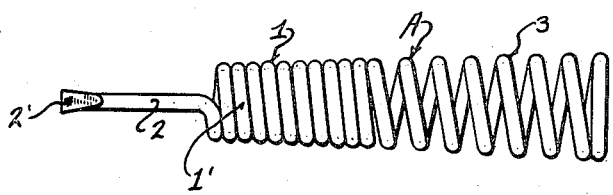
Fig. 2.
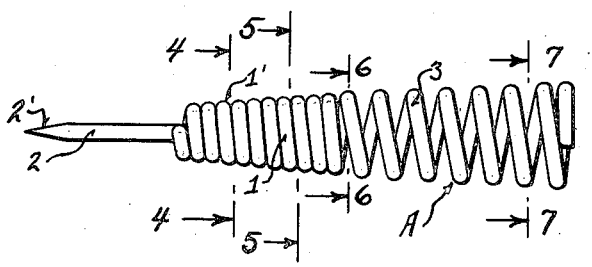
Fig. 3.     Fig. 4.     Fig. 5.
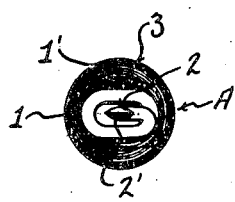 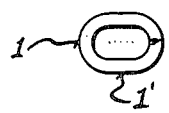 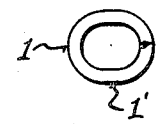
Fig. 6.     Fig. 7.
 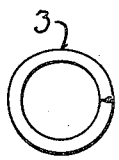
INVENTOR
ALLAN GOETTER
BY 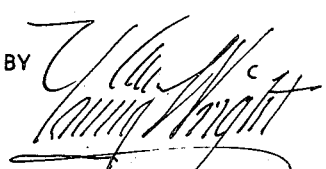
ATTORNEYS Patented Jan. 10, 1950

2,494,476

UNITED STATES PATENT OFFICE 2,494,476

REPAIR COUPLING FOR CHRISTMAS TREE BRANCHES

Allan Goetter, Wauwatosa, Wis.

Application September 16, 1948, Serial No. 49,494

1 Claim. (Cl. 248—42)

My invention refers to repair couplings for attaching branches to a Christmas tree and it has for its primary object to provide a tapered wire coil having a closed coil flat base section forming a socket, terminating with a flattened chiseled end upon a common plane with the flattened coil base, the base section terminating with an open coiled yieldable bracing section, whereby the shank of a replaced tree branch is firmly held against twisting, when set, and said branch is also yieldably supported beyond the base section to absorb load strain, it being understood that the terminal flat chiseled point is driven into the tree trunk transversely thereof, to eliminate twisting from its anchored position.

With the above and other objects in view, which will appear ts the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Fig. 1 represents a plan view of a coupling embodying the features of my invention.

Fig. 2 is a side elevation of the same.

Fig. 3 is an end view of the coupling, looking towards the chiseled point thereof.

Fig. 4 is a cross sectional view, taken upon the plane indicated by line 4—4 of Fig. 2.

Fig. 5 is another cross sectional view, taken upon the plane indicated by line 5—5 of Fig. 2.

Fig. 6 is another cross sectional view, taken upon the plane indicated by line 6—6 of Fig. 2; and Fig. 7 is a further cross sectional view, taken upon the plane indicated by line 7—7 of Fig. 2.

Referring by characters to the drawings, A indicates the completed wire coil tapered outwardly from its base. The inner section is formed with closed coils 1, flattened upon their upper and lower sides 1'—1' to form a socket.

The inner end of the socket terminates with a centrally disposed staple point 2, which staple ends with a flattened chiseled point 2', the same being in parallel alignment with the flattened sides of the socket coils.

The outer end of the socket coil terminates with an open coiled yieldable section 3, wherein said coils are circular, as indicated in Figs. 6 and 7 of the drawings.

From the foregoing description it is apparent that the chiseled point of the coupling is driven into the tree body with its flattened faces disposed transversely thereof, and it follows that the flattened upper and lower surfaces of the socket portion of the coupling are also upon the same common plane. Hence, when the shank of a repair branch is wedgingly inserted into the socket, it will be firmly held against twisting, and that portion of the tree stem immediately beyond the socketed end thereof, is yieldingly supported to resist load strain upon the repair branch.

While I have indicated the coupling as formed from a single wire, round in cross section, it is apparent that the cross sectional shape of the wire may be varied and from practical tests of the coupling, the same has proved entirely efficient as a repair element which can be readily affixed to a tree by those unskilled in the art of mechanics.

To drive the coupling into a tree trunk, the operator centers a tool against the base of the staple and utilizes a hammer to force said staple into the wood.

I claim:

A new article of manufacture, a repair coupling for Christmas tree branches, comprising a tapered wire coil including a closed coil socket base section flattened upon two sides and terminating with a centrally disposed staple having a pointed flat chisel end, the flattened faces being in horizontal alignment with the flattened coiled base socket, the outer end of said closed coil base socket terminating with an open coil yieldable section for supporting the load of a tree branch.

ALLAN GOETTER.

REFERENCES CITED

The following references are of record in the file of this patent:

UNITED STATES PATENTS

| Number | Name | Date |
|---|---|---|
| 649,367 | Seiler | May 8, 1900 |
| 1,178,558 | Turner | Apr. 11, 1916 |
| 1,780,181 | Fassen | Nov. 4, 1930 |
| 2,139,826 | Huntly | Dec. 13, 1938 |